US009440369B2

(12) United States Patent
Bayer et al.

(10) Patent No.: US 9,440,369 B2
(45) Date of Patent: Sep. 13, 2016

(54) DEVICE TO REMOVE BINDING MATERIALS FROM PACKAGED BULK GOODS

(71) Applicant: BRT Recycling Technologie GmbH, Ibbenbüren (DE)

(72) Inventors: Manfred Bayer, Tecklenburg (DE); Olaf Kränke, Hiddenhausen (DE); Andreas Plogmann, Hagen am Teutoburger Wald (DE)

(73) Assignee: KOMPOFERM GMBH (DE)

(*) Notice: Subject to any disclaimer, the term of this patent is extended or adjusted under 35 U.S.C. 154(b) by 135 days.

(21) Appl. No.: 14/162,091

(22) Filed: Jan. 23, 2014

(65) Prior Publication Data

US 2014/0230619 A1 Aug. 21, 2014

(30) Foreign Application Priority Data

Jan. 25, 2013 (DE) ........................ 10 2013 001 255

(51) Int. Cl.

| | |
|---|---|
| ***B65B 69/00*** | (2006.01) |
| ***B23P 23/00*** | (2006.01) |
| ***B26D 7/18*** | (2006.01) |
| ***B26D 7/02*** | (2006.01) |
| ***B26D 7/06*** | (2006.01) |

(52) U.S. Cl.

CPC ............. *B26D 7/1836* (2013.01); *B26D 7/025* (2013.01); *B26D 7/06* (2013.01); *B65B 69/0025* (2013.01); *Y10S 83/909* (2013.01); *Y10T 29/49819* (2015.01); *Y10T 29/49821* (2015.01); *Y10T 29/5139* (2015.01); *Y10T 83/219* (2015.04); *Y10T 83/647* (2015.04)

(58) Field of Classification Search

CPC ........... B65B 69/0025; Y10T 29/5139; Y10T 29/49821; Y10T 29/49819; Y10S 83/909

USPC ..................... 29/564.3, 426.4, 426.3; 83/909

See application file for complete search history.

(56) References Cited

U.S. PATENT DOCUMENTS 3,513,522 A * 5/1970 Thomson ............ B65B 69/0025 83/909
4,850,087 A 7/1989 Gronau
6,393,688 B1 5/2002 Axner
2011/0113941 A1* 5/2011 Norberg .............. B65B 69/0025 29/564.3

FOREIGN PATENT DOCUMENTS

| | | | |
|---|---|---|---|
| CA | 2314757 | | 1/2001 |
| DE | 3545659 | | 6/1987 |
| DE | 3707966 | | 9/1988 |
| DE | 19700568 | | 7/1997 |
| DE | 19801307 | | 7/1999 |
| DE | 60006043 | | 8/2004 |
| DE | 69820886 | | 11/2004 |
| GB | 2184704 | | 7/1987 |
| JP | 06-239323 | A * | 8/1994 |
| WO | WO-91/01919 | A * | 2/1991 |

OTHER PUBLICATIONS

Machine Translation of JP 06-239323-A, which JP '323 was published Aug. 1994.*

* cited by examiner

*Primary Examiner* — Erica E Cadugan

(57) ABSTRACT

The invention relates to a device 1 to remove binding materials 2 from packaged bulk goods 3, particularly binding wire or binding cord from compressed cuboid bales as packaged bulk goods. In order to have an automated process during removal of binding materials, a transport unit 4 is provided to transport the packaged bulk goods 3 into a gripping and cutting station 6 at which the package of bulk goods 3 is affixed on the one side by a clamping device 8 and on the other side of the package of bulk goods by a cutting device 7, and binding materials 2 are gripped by the clamping device 8 and cut by the cutting device 7.

14 Claims, 5 Drawing Sheets

DEVICE TO REMOVE BINDING MATERIALS FROM PACKAGED BULK GOODS

TECHNICAL FIELD

The invention relates to a device to remove binding materials from packaged bulk goods, particularly binding wire or binding cord, from compressed bales, particularly from compressed bales of trash, used paper, plastics, and similar.

BACKGROUND INFORMATION

Packaged bulk goods are wrapped several times with binding materials such as binding wire or binding cord in order to prevent damage to the bale and to preserve its shape. Thus, trash materials, for example after a chopping process, are compressed into cuboid bales and wrapped times with several pieces of binding wire after the compression to allow transport and subsequent recycling of the cuboid bales thus secured. Before recycling, this cuboid bale must be undone in order to supply the chopped trash remainders to a sorting process for the purpose of separation of other processing of plastic-polymer materials, recyclable fuel materials, or similar, for example. The release of binding materials from such packaged bulk goods is conventionally performed manually in that a person severs the binding wire of a cuboid bale. This consumes much time and possesses inherent risk of injury since the binding wires are usually under tension, and move in unpredictable directions when severed. Individual attempts to automate such release of packaged bulk goods to date have required a considerable of machinery.

It is the task of the invention to provide a device to remove binding materials from packaged bulk goods, particularly to remove binding wire from compressed cuboid bales of trash materials, for example, that allows automated removal of the binding materials with a justifiable level of expenditure for machinery.

To solve this task, the device of the above-mentioned type distinguishes itself by a transport unit to transport packaged bulk goods into a gripping and cutting station in which the package of bulk goods is affixed on the one side by a clamping device and on the same or the other side of the package of bulk goods by a cutting device mounted there, whereby the binding materials are gripped by the clamping device and cut by the cutting device.

SUMMARY OF THE INVENTION

A device is thus provided in which the cutting device on the one hand and the clamping device on the other hand are positioned on different sides, preferably on the opposing sides of the package of bulk goods, for example the compressed cuboid bale, such that the clamping device may grip various binding materials such as, for example, binding wire or band, and the cutting device that severs the binding wire can act approximately in parallel to said clamping device so that the binding wire is held by the clamping device and preferably then guided to a winding device or other binding material disposal device or area assigned to the clamping device. The clamping device may particularly be formed as gripping rails.

If binding wire or band is provided extending generally horizontally at each side wall on the packaged bulk goods resting on the transport device, this clamping device or gripping rail is aligned essentially vertically. Alternatively, it is of course possible for the gripping rails and the cutting device to be aligned horizontally or in another position. The clamping device and the cutting device are preferably mounted on opposite sides of the packaged bulk goods in order on the one hand, to clamp the binding materials, and on the other hand, to be able to pull them but still be able to sever the binding materials.

The clamping device preferably possesses a gripping rail that possesses a large number of non-movable affixing elements to which moveable clamping grippers are assigned. The affixing elements are separated one from the other such that a passage space for binding materials exists between them and a corresponding movable clamping gripper. The gripping rail with affixing elements may be inserted into the package of bulk goods such that the binding materials provided on the package of bulk goods may be positively fed into the spaces between the non-movable affixing elements and a corresponding movable clamping gripper by means of a large number of spaces thus formed between adjacent affixing elements. Since a corresponding number of clamping grippers is to be provided, they may then cause a movement of the affixing elements assigned to them and thus enclose the passage space because of their relative motion such that the binding materials may be gripped and firmly held in place by the affixing element and its assigned clamping grippers so that the cutter may cut the binding material after which the gripping rail will remove the binding material from the cube of bulk goods and provide it to a winder or otherwise dispose of or put aside the binding material.

The cutting device, which may also be configured as cutting rails, is located on another side of the package of bulk goods. Fixed and movable blade elements are also provided on this cutting rail that in turn are at a separation from one another so that these fixed blade elements may also be inserted into the package of bulk goods shaped as a cuboid such that the corresponding binding materials come to rest in one or more spaces between the fixed and movable blade elements. Thus, moving blades consisting, for example, of several blade teeth can move towards the corresponding fixed blade elements and sever the binding materials.

Most advantageously, the winding device is configured such that it comprises several moveable plates with winding elements mounted on it positioned one above the other and/or one adjacent to the other. The winding elements may be stud-shaped with a separation between them such that they are essentially aligned with the spaces between the affixing elements of the clamping device such that binding materials held by an affixing element and a clamping gripper can be brought between the winding elements of the winding plate by a relative motion of the clamping device with respect to the winding device. The winding plate can thus perform a winding motion and wind up the binding material. The clamping device may be designed to be flexible so that it may be moved toward the winding device so that the winding process of the severed binding material may be completed. A stripper may be used to strip the wound-up binding material from the winding plate.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

In the Figures, corresponding elements are provided with consistent reference indices.

Figure 1:
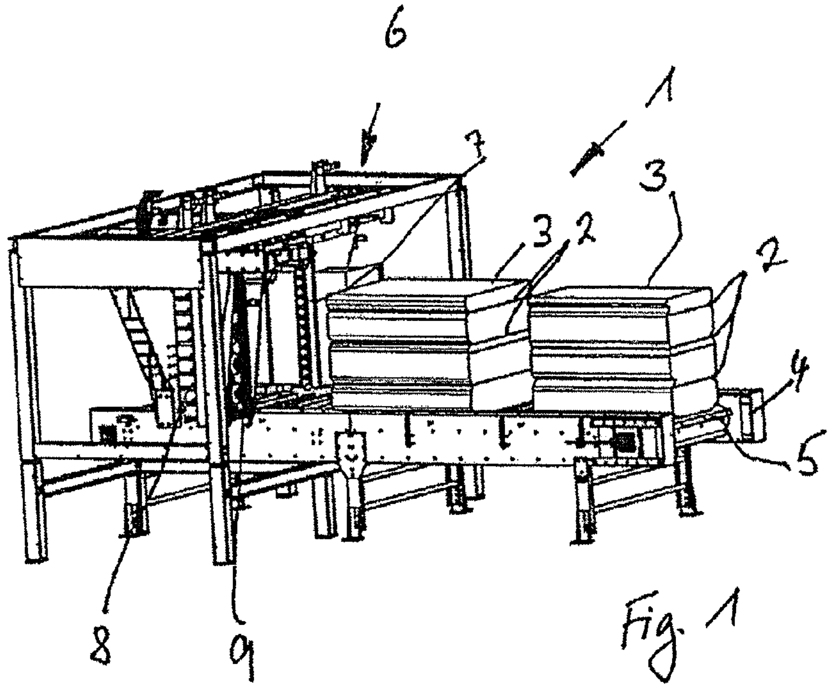
FIG. 1 perspective view of an embodiment example of a device to remove binding materials from packaged bulk goods.

FIG. 1 shows an overall view of the device 1 to remove binding materials from packaged bulk goods. In this embodiment example, cuboid bales 3 as packaged bulk goods wrapped with binding wire 2 are shown that are fed via a transport unit 4 with an endless conveyor belt 5 of a gripping and cutting station 6. The gripping and cutting station 6 comprises a cutting device 7 and a clamping device 8 along with a winding device 9.

Figure 2:
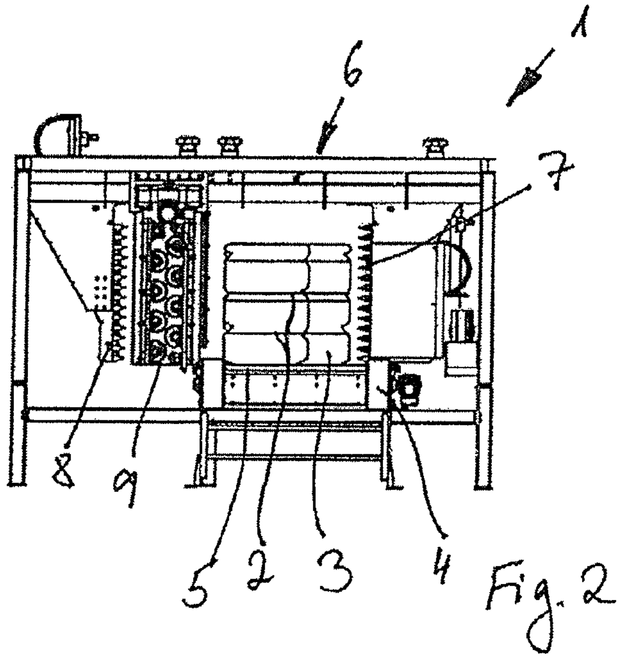
FIG. 2 front view of the transport unit and the gripper and cutter station of the embodiment example per FIG. 1.
Figure 3:
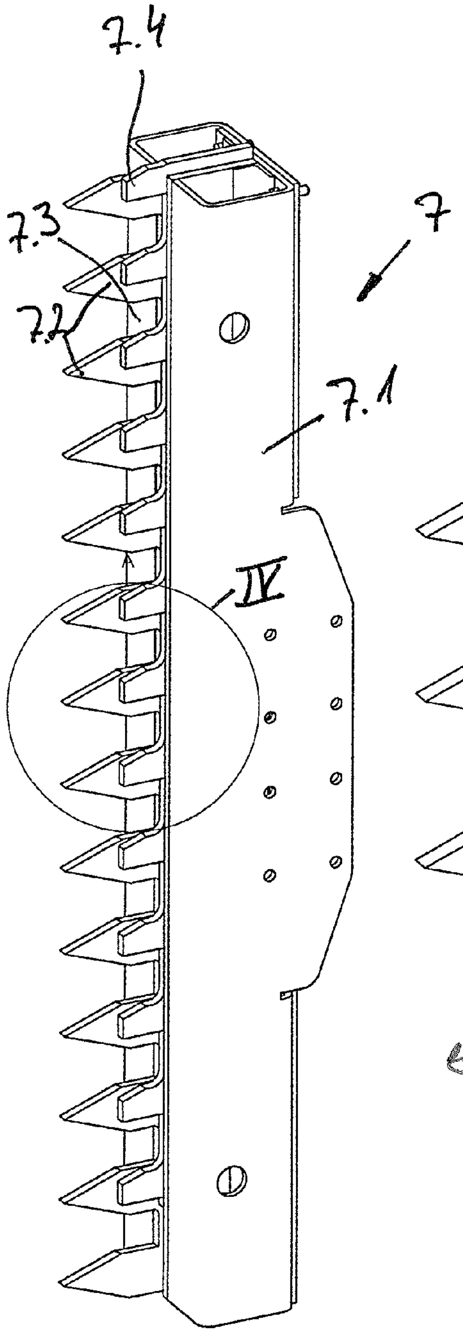
FIG. 3 perspective view of the cutting device of the embodiment example per FIG. 1.
Figure 4:
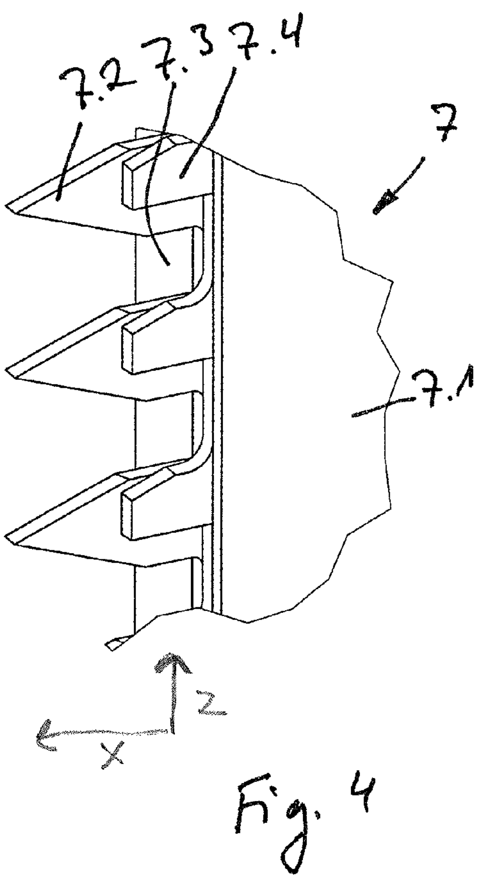
FIG. 4 enlarged section view of Detail IV in FIG. 3.

For further explanation, FIG. 2 also shows a view of the gripping and cutting station 6 seen from the front, i.e., from the front of the transport unit 4. FIGS. 3 and 4 show the cutting device 7 of the embodiment example from FIGS. 1 and 2 in greater detail. Since the binding wires 2 as binding material of the packaged bulk goods 3 in the displayed embodiment example extend essentially horizontally, the cutting device 7 in the displayed embodiment example is vertically oriented, namely as a cutting rail 7.1 that is equipped with several fixed blade elements 7.2 at a distance from one another and several tooth-shaped moveable cutting blades 7.4 that can move toward and away from the fixed blade elements 7.2.

Figure 5:
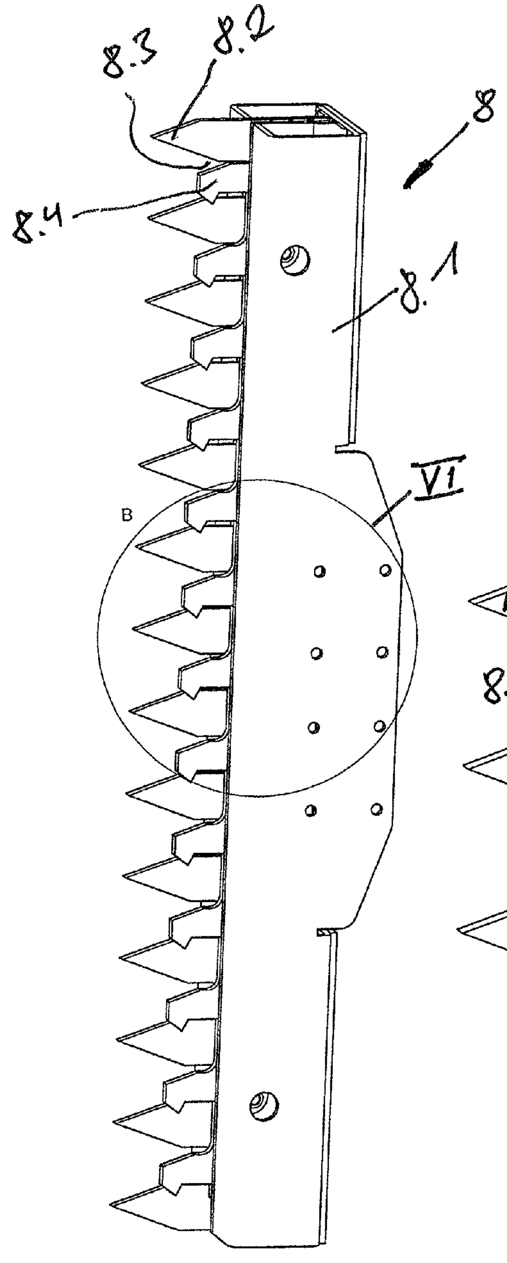
FIG. 5 perspective view of a clamping device of the embodiment example per FIG. 1.
Figure 6:
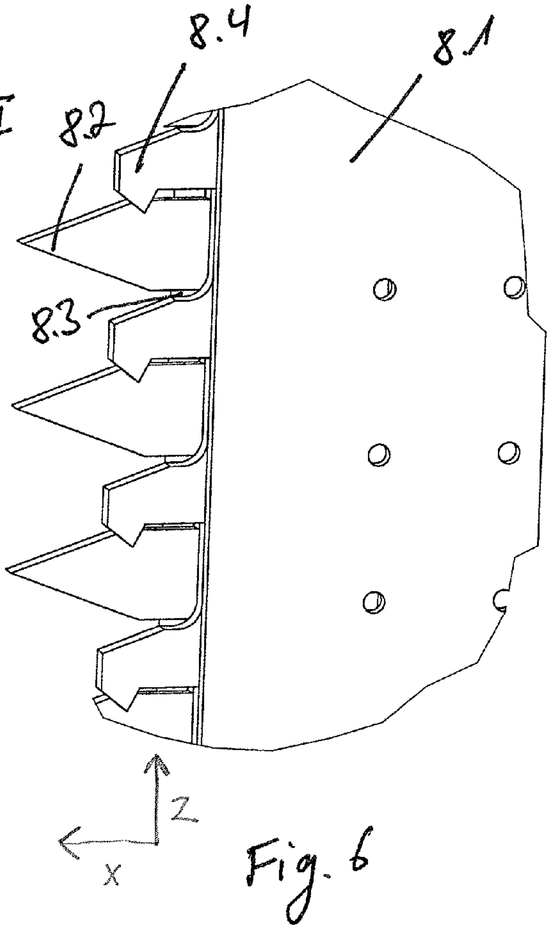
FIG. 6 enlarged section view of Detail VI in FIG. 5.

As seen in the attached drawings, there are provided teeth for the cutter 7 (cf. FIGS. 3 and 4) and the clamping device 8 (FIGS. 5 and 6). The cutter 7 is configured to cut the bands or wires 2 that hold the package 3 together, whereas the clamping device 8 is used to grab and hold the band 2 before it is cut by the cutter 7 in order to hold on to it and pass it on whenever cutting is finished.

The fixed teeth 7.2 and 8.2 of both devices are designed and configured to penetrate into the package 3 when being moved in the direction "X", so the package 3 cannot move while the cutting is performed. If the package is rather soft the bands or wires 2 "cut" into the package surface and are difficult to grab or cut. The present invention provides fixed teeth or elements 7.2, 8.2 which are tapered towards the package 3 and the part of the teeth that penetrates the package somewhat protrudes beyond the rest of the cutting 7 or clamping 8 device. By providing the tapered shape, the bands or wires 2 are guided into the sections or spaces 7.3, 8.3 while the fixed teeth 7.2, 8.2 penetrate the package 3.

Automatically, the bands or wires to be grabbed and cut are guided in a position in which they can be cut or grabbed by the movable parts 7.4, 8.4 of the cutter 7 and clamping device 8 respectively. As the fixed teeth 7.2 and 8.2 protrude beyond the parts 7.4, 8.4 in the "X" direction, the movable parts 7.4, 8.4 do not penetrate the package 3 and are so enabled to move vertically in Z-direction perpendicular to X direction as shown, although both the clamping device 8 and the cutting device 7 may be arranged in a horizontal position or orientation, which is particularly advantageous if the wires or bands 2 are arranged vertically. In this case, the cutter 7 and clamping device 8 still move perpendicular to the "X" direction in a "Y" direction (not shown) but as well-known and represented in a three dimensional plane orientation.

Because of the distance of the blade elements 7.2 from one to the other, a space 7.3 is created between the individual blade elements 7.2. In addition to the fixed blade elements 7.2, tooth-shaped moveable cutting blades 7.4 are provided that can move toward and away from the fixed blade elements 7.2. This may be seen in greater detail in the enlarged section of FIG. 4. The blade rail 7.1 is inserted into the gripping and cutting station 6 so that it may move, and can be displaced to and away from the transport bale 3 in the "X" direction.

When a package of bulk goods 3 arrives to the gripping and cutting station 6, the cutting rail 7.1 is moved to the package of bulk goods 3 in the "X" direction such that the fixed blade elements 7.2 are pressed into the package of bulk goods 3 from the side, and namely to the depth that the binding wires or bands 2 shown in FIGS. 1 and 2 make their way into one of the spaces 7.3 between adjacent blades 7.2. When the tooth-shaped movable blades 7.4 are displaced with respect to the fixed blade elements 7.2 in the "Z" direction, they sever or "cut" the binding material 2.

The clamping device 8 is mounted on the opposite side of the package of bulk goods 3 within the gripping and cutting station 6. As FIGS. 1 and 2 show, this too is oriented essentially vertically. The clamping device 8 shown in greater detail in FIGS. 5 and 6 also comprises a clamping rail 8.1, and possesses non-movable affixing elements 8.2 in the same manner as the cutting rail 7.1, whereby a space 8.3 is again provided between adjacent affixing elements 8.2 to receive the binding material 2. Movable clamping grippers 8.4 are assigned to the affixing elements 8.2 and are configured to be displaced vertically in the "Z" direction with respect to the affixing elements 8.2.

If the cuboid bale 3 is located within the gripping and cutting station 6, the clamping rail 8.1 may be moved up to the packaged bulk goods 3 and into it in the "X" direction to the depth that the affixing elements 8.2 penetrate into the packaged bulk goods 3 and, along with the blade elements 7.2, affix the packaged bulk goods 3, whereby the binding wire 2 is forced into the open space 8.3.

When the movable clamping grippers 8.4 are moved in the "Z" direction, the passage gaps 8.3 are closed, clamping the binding material 2.

On the opposite side, the binding materials 2 may be severed by the cutting device 7, after which the clamping device 8 continues to hold the binding material 2 and moves it away from the packaged bulk goods 3.

Figure 7:
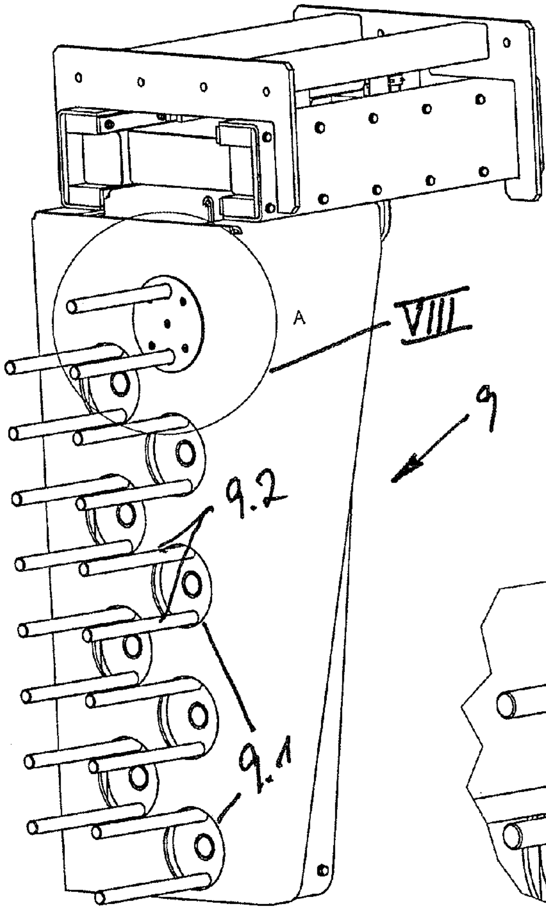
FIG. 7 perspective view of a winding device of the embodiment example per FIG. 1.
Figure 8:
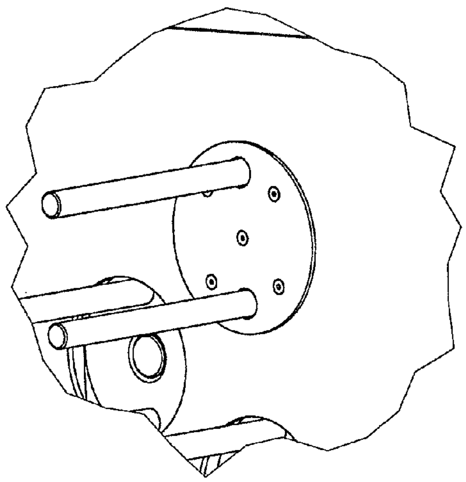
FIG. 8 enlarged section view of Detail VIII in FIG. 7.

The winding device 9 is assigned to the clamping device 8. This is visible in greater detail in FIGS. 7 and 8. It possesses several winding plates 9.1 positioned one above the other that are mounted at gaps next to, and above, one another and displaced with respect to one another. Each of these possesses two round studs 9.2 as winding elements. These assigned to the gaps 8.3 of the clamping device 8 such that, upon movement of the clamping device 8 away from the packaged bulk goods 3, the clamped binding materials 2 are guided through mutually-assigned round winding studs 9.2.

Figure 9:
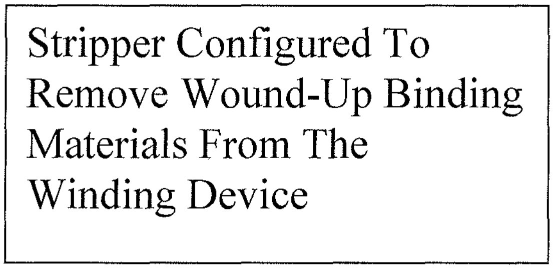
FIG. 9 schematically shows a further feature of the device for removing binding material from package bulk goods.

The winding plates 9.1 may be offset using rotational motion, after which they wind up the binding materials 2. The clamping device 8 may be affixed using an affixing means, for example a hydraulic cylinder, in the gripping and cutting station 6, or may be set by opening of this valve, such that they may follow a winding motion of the corresponding winding plate 9.1 in order precisely to wind up the binding materials 2. A stripper (schematically shown in FIG. 9) may become active in order to move the wound-up binding materials 2 away from the winding elements 9.2.

The present invention is not to be limited by any preferred or disclosed embodiment but rather, modifications and substitutions by one of ordinary skill in the art are considered to be within the scope of the present invention, which is not to be limited except by the allowed claims and their legal equivalents.

The invention claimed is:

1. Device (1) to remove binding materials (2) from packaged bulk goods (3), the device comprising:

a transport unit (4); and a gripping and cutting station (6), the gripping and cutting station comprising:

a clamping device (8) comprising a plurality of fixed teeth (8.2) and a plurality of movable teeth (8.4) that are movable relative to the fixed teeth (8.2) so as to grip the binding materials (2) between the fixed (8.2) and movable (8.4) teeth; and a cutting device (7) comprising a plurality of fixed teeth (7.2) and a plurality of movable teeth (7.4) that are movable relative to the fixed teeth (7.2) of the cutting device (7) so as to sever the binding materials (2);

wherein the transport unit (4) is configured to transport the packaged bulk goods into the gripping and cutting station (6);

wherein the clamping device (8) and the cutting device (7) are movable along an axis (X) in directions towards and away from the packaged bulk goods (3) located in the gripping and cutting station(6);

and wherein the fixed teeth (8.2) of the clamping device (8) protrude, in a direction along the axis, beyond the movable teeth (8.4) of the clamping device (8), so as to be able to penetrate into the packaged bulk goods (3) to prevent movement of the packaged bulk goods (3) during the severing of the binding materials (2), and the fixed teeth (7.2) of the cutting device (7) protrude, in a direction along the axis, beyond the movable teeth (7.4) of the cutting device (7), so as to be able to penetrate into the packaged bulk goods (3) to prevent movement of the packaged bulk goods (3) during the severing of the binding materials (2).

2. Device as in claim 1, characterized in that a winding device (9) is assigned to the clamping device (8).

3. Device as in claim 2, characterized in that the winding device (9) comprises a plurality of moveable plates (9.1), each with winding elements (9.2) mounted on it positioned one above the other and/or one adjacent to the other.

4. Device as in claim 3, characterized in that the winding elements (9.2) are shaped as studs.

5. Device as in claim 3, characterized in that the winding elements (9.2) of a respective one of the movable plates (9.1) are separated from one another by a separation that is selected such that the separation approximately aligns with a separation of two of the fixed teeth (8.2) of the clamping device (8).

6. Device as in claim 5, characterized in that the clamping device (8) may be affixed in, and released from, a position with respect to the package of bulk goods (3), so that when it is desired for the binding materials (2) to be wound up by the movable plates (9.1), the clamping device (8) with clamped binding materials (2) may be moved to a position proximate to the winding device (9).

7. Device as in claim 2, characterized in that a stripper to remove the wound-up binding materials (2) is assigned to the winding device (9).

8. Device as in claim 1, characterized in that the clamping device (8) includes a clamping rail (8.1).

9. Device as in claim 8, characterized in that the clamping rail (8.1) is equipped with the plurality of fixed teeth (8.2) of the clamping device (8), and wherein each of the plurality of fixed teeth (8.2) of the clamping device (8) is adjacent to a respective other tooth of the plurality of fixed teeth (8.2) of the clamping device (8).

10. Device as in claim 1, characterized in that each of the plurality of fixed teeth (8.2) of the clamping device (8) is positioned at a distance from one another, and in that the movable teeth (8.4) of the clamping device (8) are mounted to be moveable relative to the fixed teeth (8.2) of the clamping device (8) such that the fixed (8.2) and movable (8.4) teeth of the clamping device (8) engage and clamp inserted binding materials (2) inserted in a space (8.3) between adjacent ones of the fixed teeth (8.2) of the clamping device (8).

11. Device as in claim 1, characterized in that the movable teeth (8.4) of the clamping device (8) are movable relative to the fixed teeth (8.2) of the clamping device (8) in a direction (Z) that is perpendicular to the axis (X).

12. Device as in claim 1, characterized in that the cutting device (7) includes a cutting rail (7.1) equipped with the movable teeth (7.4) of the cutting device (7) and equipped with the fixed teeth (7.2) of the cutting device (7).

13. Device as in claim 1, wherein the binding materials (2) are in the form of binding wire or binding cord.

14. Device as in claim 1, wherein the packaged bulk goods (3) are in the form of cuboid bales.

* * * * *